(12) United States Patent
Vissamsetty et al.

(10) Patent No.: US 10,375,110 B2
(45) Date of Patent: Aug. 6, 2019

(54) LURING ATTACKERS TOWARDS DECEPTION SERVERS

(71) Applicant: Attivo Networks Inc., Fremont, CA (US)

(72) Inventors: Venu Vissamsetty, San Jose, CA (US); Srikant Vissamsetti, Bangalore (IN); Muthukumar Lakshmanan, Bangalore (IN); Harinath Vishwanath Ramchetty, Bengaluru (IN); Vinod Kumar A. Porwal, Bangalore (IN)

(73) Assignee: ATTIVO NETWORKS INC., Fremont, CA (US)

( * ) Notice: Subject to any disclaimer, the term of this patent is extended or adjusted under 35 U.S.C. 154(b) by 244 days.

(21) Appl. No.: 15/153,471

(22) Filed: May 12, 2016

(65) Prior Publication Data

US 2017/0331856 A1    Nov. 16, 2017

(51) Int. Cl.
*H04L 29/06*    (2006.01)

(52) U.S. Cl.
CPC ...... *H04L 63/1491* (2013.01); *H04L 63/1416* (2013.01)

(58) Field of Classification Search
CPC .............. H04L 63/1491; H04L 63/1416
See application file for complete search history.

(56) References Cited

U.S. PATENT DOCUMENTS

| 8,549,643 | B1* | 10/2013 | Shou | G06F 21/556 |
| | | | | 455/410 |
| 8,893,278 | B1* | 11/2014 | Chechik | H04L 63/145 |
| | | | | 713/188 |
| 8,943,594 | B1* | 1/2015 | Arrowood | G06F 21/53 |
| | | | | 726/23 |
| 2005/0204157 | A1* | 9/2005 | Johnson | H04L 63/1491 |
| | | | | 726/22 |
| 2006/0101515 | A1* | 5/2006 | Amoroso | H04L 29/12009 |
| | | | | 726/23 |
| 2007/0025374 | A1* | 2/2007 | Stefan | H04L 63/0227 |
| | | | | 370/401 |
| 2010/0269175 | A1* | 10/2010 | Stolfo | G06F 21/55 |
| | | | | 726/22 |
| 2012/0030745 | A1* | 2/2012 | Bauer | G06F 21/35 |
| | | | | 726/9 |

(Continued)

*Primary Examiner* — Harunur Rashid
(74) *Attorney, Agent, or Firm* — David R. Stevens; Stevens Law Group

(57) ABSTRACT

Endpoints in a computer network create connections to a deception server without sending any payload data. The connections create records of the connection on the endpoints, by which an attacker accesses the deception server. Received packets that include payload data are determined to be unauthorized. The deception server acquires IP addresses in various VLANS and provides these IP addresses to the endpoints over a secure channel. The connections from the endpoints to the deception server are not performed on the secure channel. IP addresses acquired by the deception server are not assigned to an interface. Instead, NAT is used to route packets including the IP addresses to various engagement servers. Each IP address is assigned a unique hostname in order to appear as multiple distinct servers. The deception server further generates broadcast traffic to generate other records that may be used to lure an attacker to the deception server.

14 Claims, 5 Drawing Sheets

(56) References Cited

U.S. PATENT DOCUMENTS

2016/0072838 A1\* 3/2016 Kolton ................. H04L 63/145
                                                          726/23
2017/0264639 A1\* 9/2017 Sama .................... H04L 63/029

\* cited by examiner

LURING ATTACKERS TOWARDS DECEPTION SERVERS

BACKGROUND

Traditional perimeter defenses are no longer able to prevent advanced persistent threats (APT) to a network. APT attacks are carried out by sophisticated attackers using concentrated and coordinated efforts that eventually succeed in getting a foothold inside the enterprise network. Once an attacker gets into the network, the next steps will be to learn the network, critical assets and try to move laterally to different systems looking for sensitive and confidential data.

The attacker has to learn the network and critical assets in a way that doesn't expose him. Any active scan or sweep by the attacker to identify assets can easily be caught by security devices in the network. So attackers use a passive approach to detect assets on the network which could include:

Netstat provides all the active connections on an endpoint.

An ARP cache provides the IP to MAC mapping for the devices in the layer2 broadcast domain with which there were packet exchanges.

A Routing table provides an idea about the network and communication paths.

A DNS cache provides the list of recently resolved domain names.

Network shares

Broadcast and multicast traffic

The systems and methods disclosed herein provide an improved approach for dealing with APT attacks.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
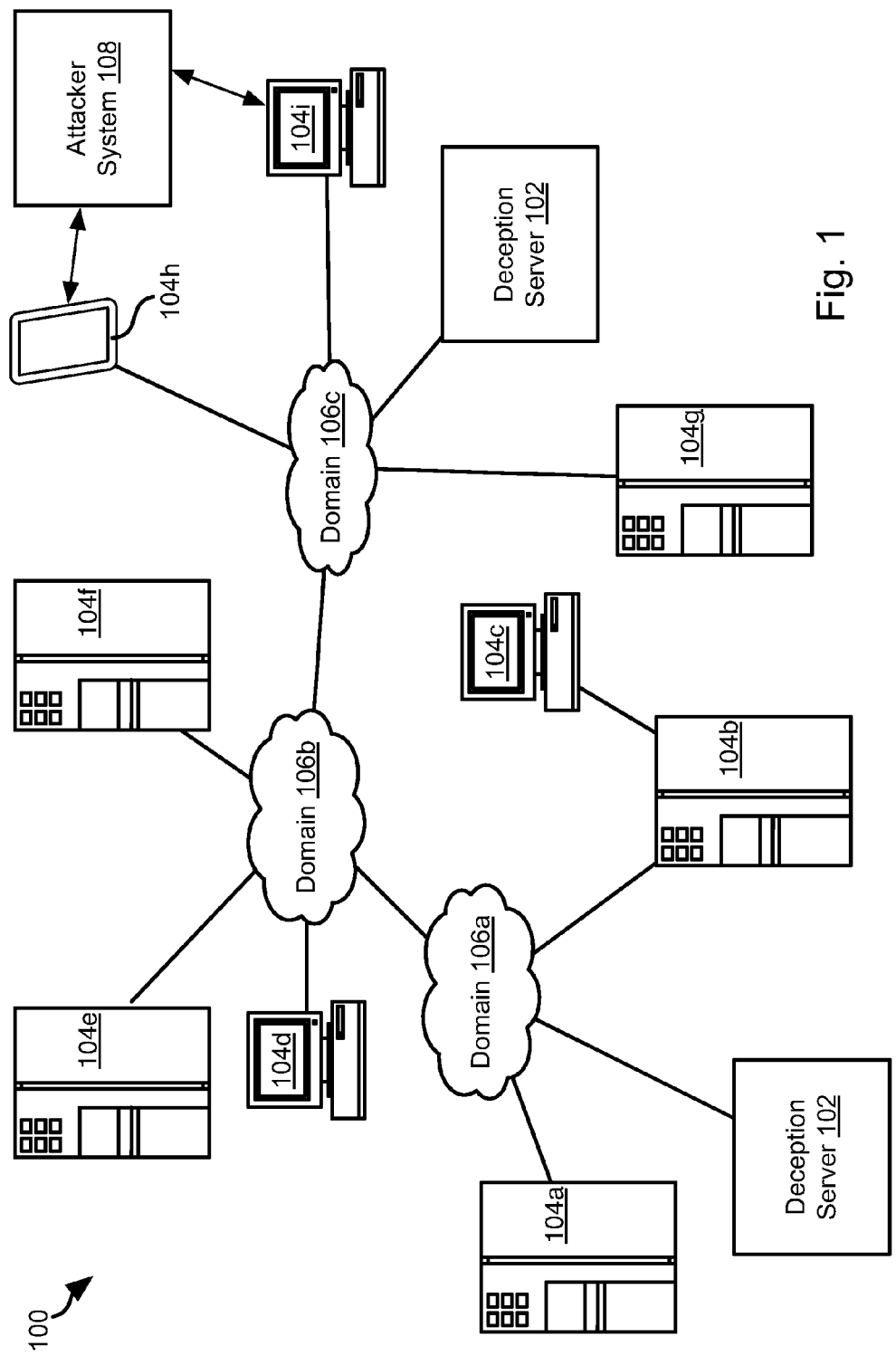
FIG. 1 is a schematic block diagram of a network environment for performing methods in accordance with an embodiment of the present invention.

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Smalltalk, C++, or the like and conventional procedural programming languages, such as the "C" programming language or similar programming languages, and may also use descriptive or markup languages such as HTML, XML, JSON, and the like. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, a network environment 100 may include one or more deception servers 102 operable to simulate the function of one or more endpoints. In particular, the deception server 102 may simulate operation of a server offering a plurality of network services. The deception server 102 may also simulate operation of any machine that may operation as a network endpoint or other network connected device. For example, a network endpoint in the network environment may include any machine running an operating system that can establish a network connection, such as an oscilloscope, a device running as a PLC (programmable logic controller), and the like. The deception server 102 may therefore emulate the behavior of any such endpoint as well as the behavior of a server implementing one or more network services. The operation of the deception server is described in greater detail below.

An attacker inside the network can be caught using decoy servers deployed in the network. The deception servers preferably look like a production server or other machine and run most of the standard services available in a production network. An attacker can be lured to the deception servers by inserting breadcrumbs on endpoints. However, once an attacker has detected that the system is a decoy without much intrusion, he will evade the decoy and look for targets elsewhere. The deception server 102 implements methods disclosed herein in order to avoid detection as a deception server.

The network environment 100 further includes a plurality of endpoints 104a-104i. The endpoints may be embodied as server systems, laptop or desktop computers, tablet computers, mobile phones, or any other device that may establish a network connection. The network environment 100 may include a plurality of domains 106a-106c. Each endpoint 104a-104i may be a node of a domain 106a-106c. The domains may be embodied as DNS domain, MICROSOFT ACTIVE DIRECTORY domains, or any other portion of a network. A domain 106a-106c may include networking components such as routers, switches, firewalls and the like.

An attacker system 108 may gain access to an endpoint 104a-104i and attempt to connect to other endpoints 104a-104i and to access other data and resources of the network environment 100. As described in greater detail below, the endpoints 104a-104i store data that references the decoy server 102. The information changes over time and includes multiple references to the decoy server 102 such that detection of the decoy server 102 is less likely.

Figure 2:
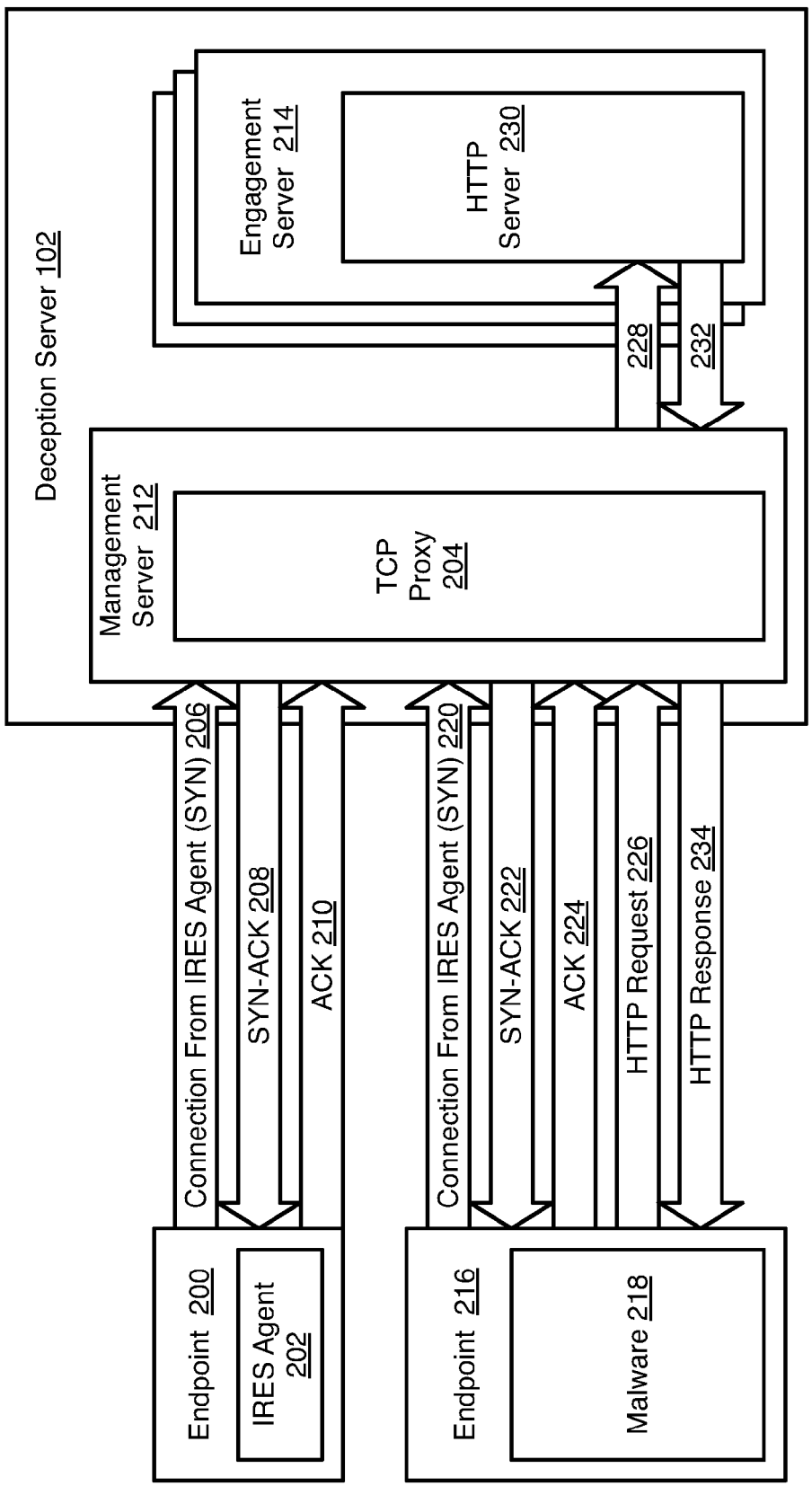
FIG. 2 is a schematic block diagram of method for generating connections to a deception server and for detecting attacks in accordance with an embodiment of the present invention.

Referring to FIG. 2, and endpoint 200 may host an IRES (information relay and entrapment system) agent 202. The endpoint 200 may be embodied as any of the endpoints 104a-104i of FIG. 1. In some embodiments, each end point 104a-104i in the network environment executed the IRES agent 202.

To identify potential targets on the network, an attacker uses the "netstat" tool to look at active network connections on an endpoint. From the active connection list, the attacker can identify internal servers and other network resource that he can start attacking. If a deception server 102 shows up in the connection table, it is highly likely that the attacker will start attacking the deception server.

A connection entry in the connection table gets created on an endpoint only when an active connection is established from an endpoint to a server. The IRES agent 202 that runs on the endpoint can open a network connection to an active service on the deception server 102 and this could create a connection entry for the deception server in the connection table. However, this can cause the connection tables to overflow on the deception servers 102 as there could be thousands of endpoints running instances of the IRES agent 202.

Some embodiments include deception servers that are programmed to manage the special connections between IRES agent 202 and the deception server 102 that are intended only to create a connection table entry. In particular, the special connections are managed such that a real connection exists from the endpoint's perspective whereas no connection exists from the deception server's 102 perspective. However, connections from an attacker on the same endpoint to the deception server will work in the normal way. The workflow for this solution is described below with respect to FIG. 2.

The IRES agent 202 generates data referencing the decoy server 102 on the endpoint 200. For example, the IRES agent 202 may cause the endpoint 200 to establish a connection to the decoy server 102, such as by establishing a connection with a TCP (transmission control protocol) proxy 204 executing on the decoy server 102. In some embodiments, the IRES agent 202 performs no more than a TCP handshake with the TCP proxy 204 but does not send any payload data over the established connection. In the illustrated embodiment, this includes sending a connection request 206 to the TCP proxy 204, such as a SYN packet. The endpoint 200 receives acknowledgement 208 of the connection request, e.g. a SYN-ACK packet. The endpoint 200 then sends an acknowledgment 210, e.g. an ACK packet. This exchange will create a record of the connection on the endpoint 200. In order to make the deception better, the IRES agent 202 may close the connections periodically at random intervals and open new connections with different deception servers 102, which may be the same deception server with a different IP (internet protocol) address and/or hostname as described below.

In some embodiments, the IRES agent 202 generates connection requests 206 only for network services that do not require the server to send data once a connection is successfully established. Accordingly, the connection request 206 may include a SYN packet according to the TCP protocol as well as other data corresponding to a connection request according to a network protocol for such a network service.

In some embodiments, the deception server may execute a management server 212 and a plurality of engagement servers 214. The management server 212 may be programmed to control the network traffic to the engagement servers 214. The management server 212 may host the TCP proxy 204 and the TCP proxy 204 may be programmed to processes TCP packets to an IP addresses acquired by the deception server (an "acquired IP address") and requesting specific services running on the engagement servers 214. When a TCP SYN packet 206 is received that references an acquired IP address, the TCP proxy 204 generates a SYN-ACK 208 response using a modified SYN cookie technique without creating any connection entry. The ISN (Initial Sequence Number) in the SYN-ACK is generated as a cookie using the connection tuples.

When the final ACK 210 of 3WH (three way handshake) is received, the legitimacy of the ACK can be confirmed if the cookie can be regenerated successfully. If the ACK packet is legitimate but does not have any payload, the ACK packet is discarded by the TCP proxy 204 and no further action is taken. No connection entry is created on the engagement server 214 up to this point.

To identify potential targets on the network, an attacker looks at various tables and caches on the endpoint 200. If the decoy server 102 shows up in those tables and caches, it is highly likely that the attacker will start attacking the decoy server 102. A connection entry in the connection table is created on the endpoint 200 only when an active connection is established from an endpoint to a server. The IRES agent 202 that runs on the endpoint 200 therefore opens a network connection to an active service on the deception server 102, such as using the approach described above, and thus creates a connection entry for the deception server 102 in the connection table of the endpoint 200. Additionally, a DNS (domain name service) cache entry and an ARP (address resolution protocol) entry is created on the endpoint 200 when the deception server 102 is on the same subnet as the endpoint 200. In particular, a DNS cache entry will be created when an attacker tries to resolve the domain name of the deception server 102. For example, the domain name of the deception server 102 may be obtained from data generated on an endpoint using the methods disclosed herein. An ARP cache entry is created when the deception server 102 is on the same subnet as the endpoint.

Creating a connection from every endpoint 200 to the deception server 102 can cause the connection tables to overflow on the deception server 102 as there could be thousands of endpoints running the IRES agent. In some embodiments, the creation of entries in the connection table of the deception server is avoided by ensuring that the IRES agent 202 does not send any payload data over the connection established to the TCP proxy 204. By not creating connection table entries for connections over which no payload data is sent, connection table overflow on the VMs (virtual machines) of the deception server 102 due to the special connections established by the IRES agents 202 is avoided.

However, connections from an attacker on the same endpoint to the deception server will work in the normal way. For example, referring again to FIG. 2, an endpoint 216 hosting malware 218 may perform a TCP handshake with the TCP proxy 204, such as by sending the SYN packet 220, receiving the SYN-ACK packet 222, and sending an ACK packet 224. The endpoint 216 may be an attacker system 108 or an endpoint 104a-104i that has been infected with the malware 218.

In contrast to the IRES agent 202, the malware 218 may then send a request over the newly-established connection, i.e. actual payload data. In the illustrated example, this includes an HTTP (hypertext transfer protocol) request 226 that is received by the TCP proxy 204 and forwarded 228 to an HTTP server 230 executing on one of the engagement servers 214. The HTTP server 230 generates a response 232 and the response is forwarded 234 to the endpoint 212.

In response to detecting the payload data over the connection, the deception server 102 determines that the endpoint 216 is an attacker system or an endpoint infected with malicious code. The deception server 102 may take various remedial actions such as generating an alert (email, text, in-application message, or the like), monitoring actions of the malware 218 to generate a profile of the malware 218, isolating the endpoint 216 from resources of the network other than the deception server 102 and other deception servers 102, and the like. The profile of the malware 218 may be shared with other endpoints 104a-104i to enable detection of other instances of the malware 218 in order to avoid further intrusions. Any other action known in the art for responding to network intrusions may be taken in response to detection of the malware 218 according to the embodiments disclosed herein. The actions taken may further include the monitoring and protection functions disclosed in U.S. application Ser. No. 14/458,026, filed Aug. 12, 2014, and entitled DISTRIBUTED SYSTEM FOR BOT DETECTION, which is hereby incorporated herein by reference in its entirety.

In some embodiments, if the 3WH (elements 220-224 of FIG. 2) with a client (e.g. an endpoint 216) is followed by payload from the client, the TCP proxy 204 initiates a 3WH with a designated engagement server 214 on behalf of the client. The TCP proxy 204 may use destination NAT (network address translation) to translate the original destination IP address in the client request to the internal IP of the designated engagement server 214. The response from the engagement server 214 is sent by TCP proxy 204 to the client after performing the necessary NAT translations (e.g. by replacing the IP address of the engagement server 214 in the response with the original destination IP address included in the client request).

In contrast, the IRES agent 202 running on an endpoint opens a network connection to one of the IP addresses for a service like HTTP and leaves it open. When the TCP proxy 204 responds back with a SYN-ACK, the connection entry on the endpoint moves to an "ESTABLISHED" state in the TCP connection table of the endpoint, whereas no real connection will exist on the deception server 102.

Accordingly, an attacker using the "netstat" tool will find an IP address acquired by the deception server 102 in the connection table. If an attacker on the endpoint 216 makes a connection to the acquired IP address of the deception server 102, such as an HTTP request, the HTTP request packet from the endpoint 216 will cause the TCP proxy 204 to use NAT to internally translate the acquired IP address to the address of the engagement server 214 hosting the HTTP server 230. The deception server 102 therefore successfully engages with the attacker and may generate alerts in response to the engagement as described above.

In summary, the approach described above with respect to FIG. 2 may provide some or all of the following functionality:

The TCP proxy 204 may be an internal module on the deception server 102. TCP packets to acquired IP addresses are intercepted and translated by TCP proxy.

The TCP proxy may perform the 3WH for connection requests to the acquired IP addresses using the SYN cookie technique.

For connections that do not go beyond 3WH, the TCP proxy does not maintain any state.

For connections with payload, the TCP proxy initiates a 3WH on behalf of the client with a designated engagement server 214. Destination NAT is done by the TCP proxy module to translate the original destination IP address to the engagement server's 214 internal address NAT and routing to a VM executing the engagement server 214 is done internally on the deception server 102.

Figure 3:
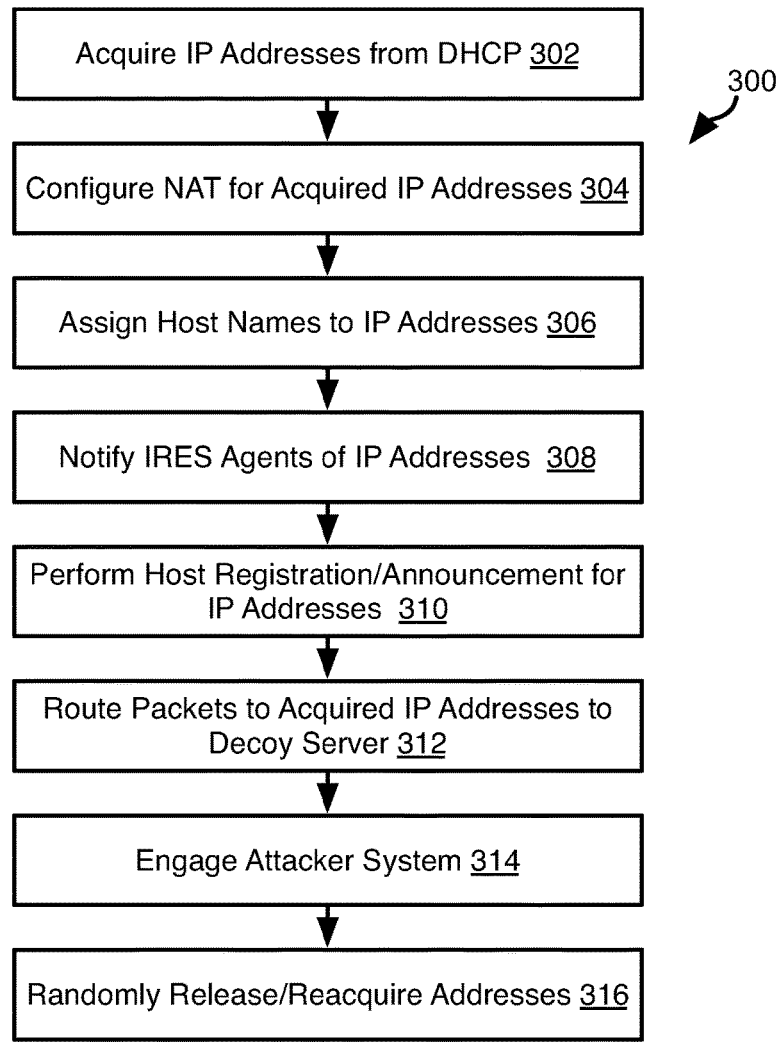
FIG. 3 is a process flow diagram of a method for implementing polymorphic deception servers in accordance with an embodiment of the present invention.

Referring to FIG. 3, if deception servers 102 have fixed attributes, it is very likely that attackers will avoid them once they have detected them to be decoy servers. By constantly changing some of the attributes of the deception servers, an attacker can be fooled to believe them to be new servers and thereby the attacker's progression can be delayed and disrupted.

The illustrated method 300 illustrates a method 300 whereby the network level attributes of the deception server 102 are periodically changed, e.g. at random intervals. In particular, the IP address and the MAC (machine access code) addresses associated with the deception server 102 are changed.

The deception server 102 acquires 302 IP addresses on different VLANs (virtual local area networks) using out-of-band DHCP (dynamic host configuration protocol) or static assignment. A range of unused MAC addresses will be used to acquire the IP addresses out-of-band. The acquired IP addresses will never be assigned to a VM (virtual machine) executing on the deception server 102.

However, the deception server 102 will intercept, or invoke interception, of network packets to the acquired IP addresses and perform, or invoke performance of Network Address Translation (NAT) to one of the deception servers 102 assigned IP addresses (e.g. an internal IP associated with a VM executing on the deception server 102) and delivers them to the respective engagement server. This mechanism ensures that an attacker who tries to communicate with the acquired IP address is successfully engaged with one of the engagement server. Accordingly, the method 304 may include configuring NAT 304 such that packets addressed to the acquired 302 IP addresses will be transmitted to the deception server 102, such as to a particular VM executing on the deception server 102. Configuring 302 NAT may include configuring a separate router or other network component or configuring a component executing on the deception server 102 itself to perform NAT. In some embodiments, no explicit NAT configuration is performed. Instead, a component executed by the deception server 102 automatically intercepts network packets destined to the acquired IP addresses and performs network address translation.

The method 306 may further include assigning 306 host names to the acquired 302 IP addresses. In some embodiments, a network environment may include a plurality of deception servers 102 that are each assigned a hostname. However, once an attacker determines the hostname of the deception server 102, the attacker will avoid the deception server 102 and start looking for other targets. If the hostname of the deception servers are constantly changed, the attacker can be fooled to believe that there are multiple different servers on the network.

An attacker attempting to probe the different IP addresses of the deception server 102 in a conventional system would see the same hostname for all of them, which could look suspicious to the attacker. In order to fool the attacker, the deception server 102 presents a different hostname to the attacker for each of the IP address acquired by the deception server. This can be achieved by modifying the NBNS response from the deception server to contain a unique hostname assigned to an IP address when the IP address is queried by an attacker.

The most common technique used to identify the hostname and other related attributes of a machine is by sending a query to the remote machine using a tool such as "Nbstat," which will cause the remote machine to return certain items of information, which typically includes the hostname of the remote machine. Even though the network environment 100 may have a limited number of deception servers 102, a single deception server 102 can have presence in multiple VLANs and can acquire multiple IP addresses per deception server 102. The deception server therefore presents the hostname to the attacker for each of the IP address acquired by the deception server 102. This can be achieved by modifying the NBNS (NetBIOS Name Service) response from the deception server 102 to contain the hostname assigned to an IP address when the IP address queried by an attacker.

The method 300 may further include notifying 308 the IRES agents 202 of some or all endpoints of the network environment of the IP addresses and/or host names acquired 302 by the deception server 102. In this manner, the IRES agent 202 may initiate connections to each of the IP addresses in the manner described above with respect to FIG. 2. Notifying 308 may include transmitting the notification over a secure, encrypted channel between the deception server 102 and the IRES agent 202. In some embodiments, the connection requests of FIG. 2 are not sent over this encrypted channel such that an attacker-accessible record of the connections is created on the endpoint 200 as noted above.

The method 300 may further include performing 310 actions that will inform other endpoints of the IP addresses associated with the deception server 102. The actions performed at step 310 may be performed with respect to endpoints in the same domain, VLAN, or other network portion including the deception server 102 or from which the IP address was acquired at step 302. In particular, the endpoints with respect to which the actions 310 are performed may be those for which the actions 310 are performed in a conventional network using conventional techniques, except that the deception server 102 is not an actual production server and the IP addressed are acquired 302 without actually assigning them to any interface.

For example, an enterprise may deploy computers using directory services. WINDOWS Active Directory is a popular product that authenticates and authorizes users and computers in a network. The WINDOWS operating system supports various commands (Ex: net view, net view/all, net view/domain:name) to get list of computers in domain, shares etc. Attackers can use these tools to find the deception server 102 in a domain and target it.

Step 310 may therefore include emulating, by the deception server 102, the MICROSOFT browser protocol and participate in host announcement and registration process for various VMs executing on the deception server 102. The decoy server 102 will therefore show up in network discovery of computers used by attackers.

Some virtual operating systems, such as may be implemented in the deception server 102, allow configuration of 255 virtual network interfaces for an operating system. The emulation process may therefore assign unique host names for each of these virtual interfaces (see, e.g., step 306 described above) and emulate browser registration for each virtual interface. A single decoy virtual machine executing on the deception server 102 can therefore appear as hundreds of hosts when attackers discover machines using network discovery commands like "net view." In some embodiments, the host names assigned to acquired IP addresses may be mapped to virtual interfaces (e.g. ports associated with particular network services) in a VM executing on the deception server 102. In such embodiments, the host names may be registered with a name server (e.g. a DNS server, Active Directory server, or other name server).

The actions performed at step 310 may further include sending periodic ARP requests for the default gateway and NBNS broadcast packets on each of the networks where the decoy server 102 has a presence, e.g. has acquired 302 an IP address. Attackers snooping broadcast packets to identify potential targets can see these packets and could potentially be lured to the deception server 102.

The method 300 may further include routing 312 packets addressed to the IP addresses acquired at step 302 to the deception server 102, such as to a VM of the deception server 302 configured to receive packets addressed to a particular IP address acquired at step 302. As noted above, this may include performing NAT to address packets including an acquired 302 IP address to the deception server 102, such as to a particular VM executing on the deception server 102. The manner in which an attacker learns of the IP address may include accessing a connection table of an endpoint populated with the IP address according to the approach of FIG. 2 or finding the IP address in data generated according to step 310.

In either case, the deception server 102 then engages 314 the attacker, such as using a VM assigned to the service requested by the attacker. Engaging the attacker may include implementing one or more network services and responding in a conventional manner to instructions from the attacker. However, engaging 314 the attacker further includes monitoring actions taken by the attacker or malicious code provided by the attacker such that attacks on production servers or endpoints may be detected and prevented. For example, monitoring may include monitoring actions taken by an attacker and malicious code uploaded by an attacker to an endpoint of the network environment and generating a schema characterizing the attacker and malicious code as described in U.S. application Ser. No. 14/458,026. An example approach for responding to attempts to access network servers on the deception server 102 is described below with respect to FIG. 5.

The method 300 may further include randomly releasing 316 IP addresses acquired at step 302 and reacquiring new IP addresses. For example, the deception server 102 may periodically release the IP addresses and acquire new IP addresses using new MAC addresses from the unused pool for a particular VLAN. A randomization factor may be added to the time period for the release and acquisition of IP addresses such that it does appear to be an automated process. With this approach, an attacker sees new servers coming up constantly on the network.

Figure 4:
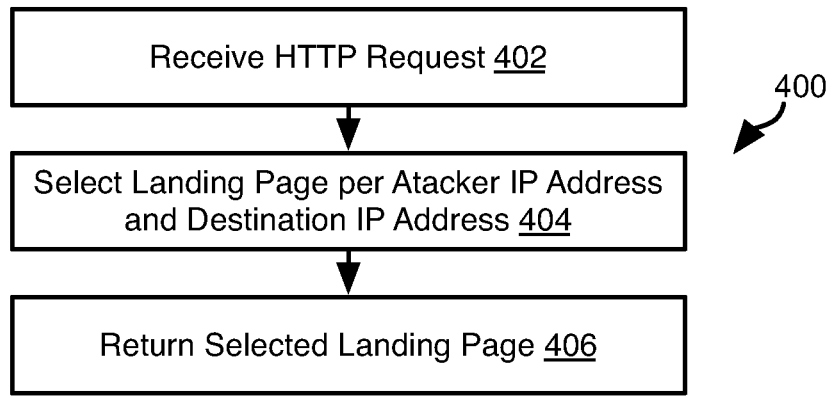
FIG. 4 is a process flow diagram of a method for processing HTTP requests in accordance with an embodiment of the present invention.

Referring to FIG. 4, the illustrated method 400 may be used by a deception server to respond to requests received over a connection from an attacker system 108f. The deception server 102 may have running a set of conventional network services. However, it is important to have the application content for each service changing constantly in order to confuse the attacker.

In the case of HTTP, the deception server 102 may have several different versions of content and landing pages. The method 400 may therefore include receiving 402 an HTTP request and selecting 404 the landing page to return to the attacker based on a combination of the attacker IP and the server IP used in the request, e.g. and IP address acquired and distributed according to the method 300 of FIG. 3. This gives the attacker an impression that there are several different web servers that can be targeted. The selected landing page is then returned 406 to the attacker.

In another example, for applications like SSH (secure shell), FTP (file transfer protocol), and TELNET, the banner that is provided to the attacker may be changed periodically on the deception server 102.

Figure 5:
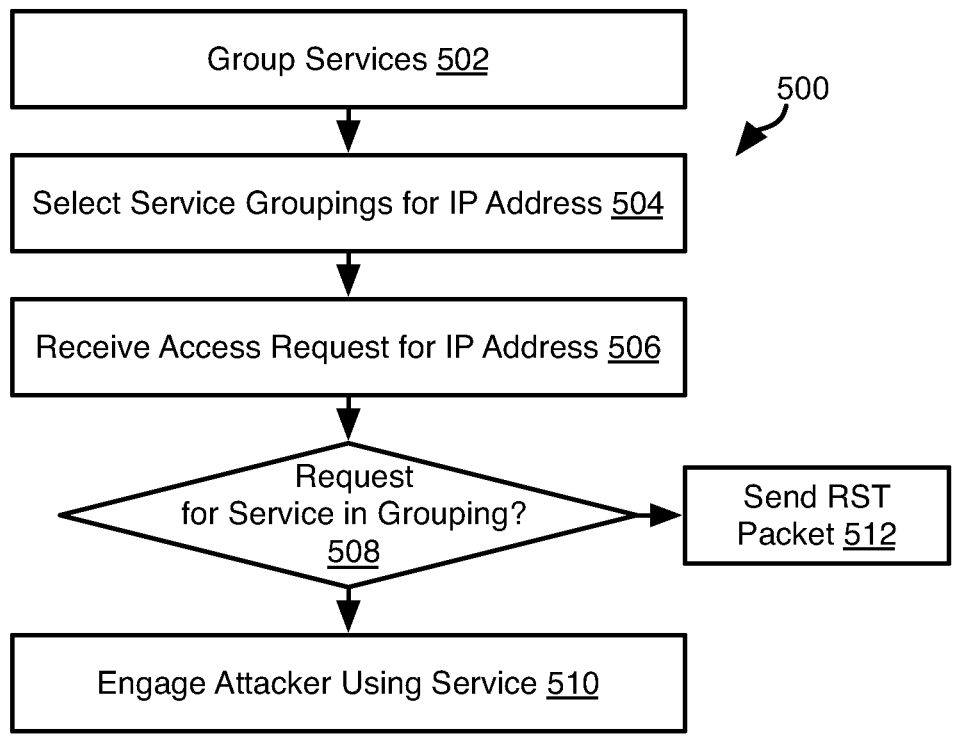
FIG. 5 is a process flow diagram of a method for providing simulated service groupings in accordance with an embodiment of the present invention.

Referring to FIG. 5, the illustrated method 500 may be used to group services in order to simulate behavior of an actual production server. In some embodiments, each deception server 102 implements a large number of services that are open to be attacked. However, if an attacker performs a scan on any of the deception servers 102 and finds several distinct services to be running on it, he may suspect the deception server 102 to be a decoy and will avoid attacking it.

To deceive the attacker from suspecting the deception server 102, a technique called "logical service grouping" can be used. Specifically, services on the engagement servers may be logically grouped 502. For e.g., SSH, HTTP & Telnet services can be part of a group. A container called service template will have the services under a logical group. Several such service templates will be created by default based on the operating system and the services supported on deception server 102.

When an attacker targets a specific service supported on the deception server 102, a service template that contains the particular service is selected 504 and applied to the attacker-IP. A request for a service is received 506 by the deception server 102 that references an IP address acquired by the deception server 102. If the requested service is found 508 to be in the service template selected for that IP address, the deception server 102 will engage 510 the attacker for the requested service, e.g. generate a response using the requested service, and any other requests for the other services listed in the service template selected for that IP address. Engaging 510 may include analyzing attacker actions and generating a schema describing the attacker and/or malicious code received from the attacker according to the methods disclosed in U.S. application Ser. No. 14/458, 026.

However, If the attacker if found 508 to request a service that is not included in the service template for that IP address, the deception server 102, the deception server 102 sends 512 a RST packet (connection rejection message) even though the service could be running on the deception server 102. Thus the attacker sees only a limited set of services for a given IP address.

Figure 6:
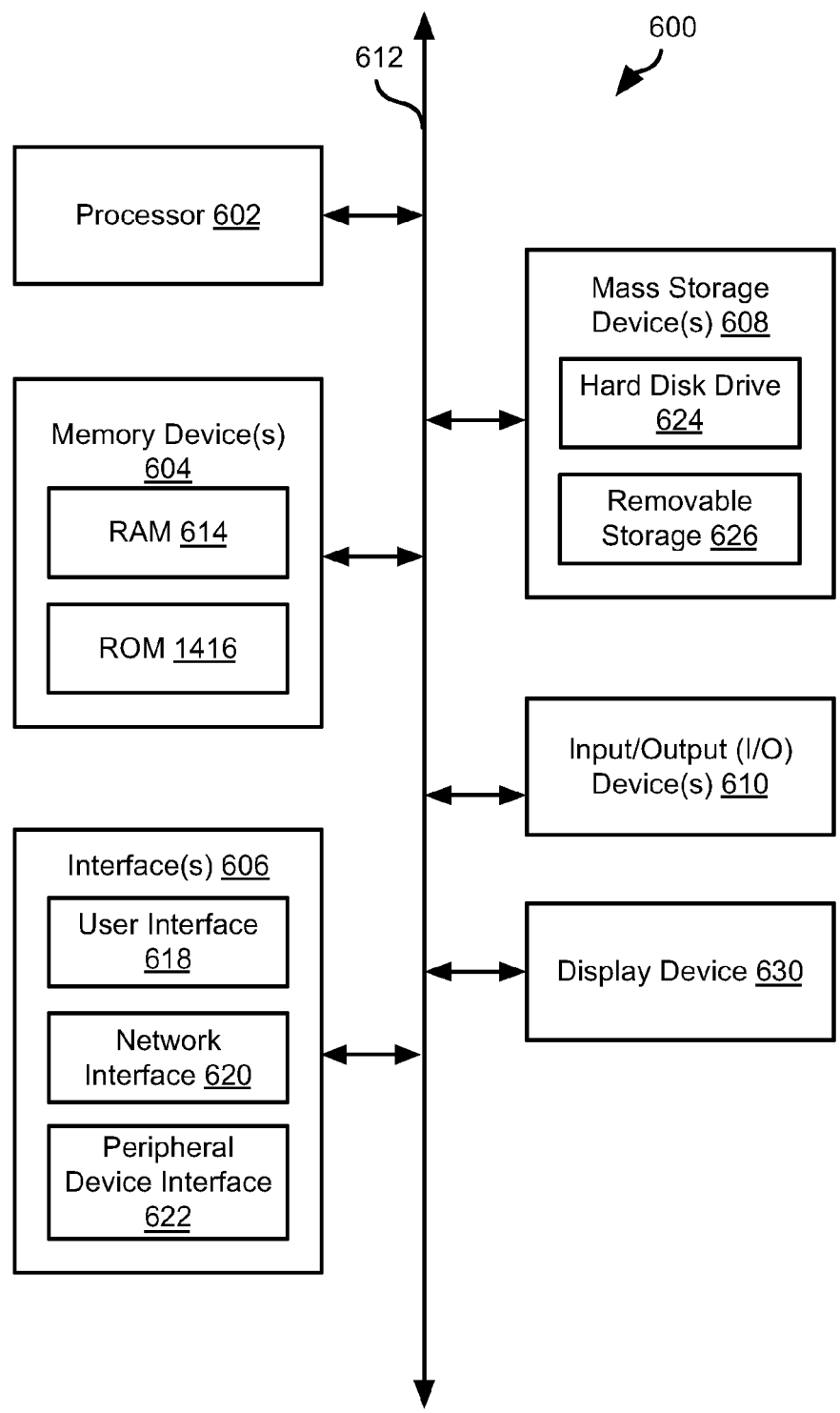
FIG. 6 is a schematic block diagram of a computer system suitable for implementing methods in accordance with an embodiment of the present invention.

FIG. 6 is a block diagram illustrating an example computing device 600 which can be used to implement the systems and methods disclosed herein. The deception server 102 and endpoints 104a-104i may have some or all of the attributes of the computing device. Computing device 600 can function as a server, a client, or any other computing entity. Computing device 600 can perform various monitoring functions as discussed herein, and can execute one or more application programs, such as the application programs described herein. Computing device 600 can be any of a wide variety of computing devices, such as a desktop computer, a notebook computer, a server computer, a handheld computer, tablet computer and the like.

Computing device 600 includes one or more processor(s) 602, one or more memory device(s) 604, one or more interface(s) 606, one or more mass storage device(s) 608, one or more Input/Output (I/O) device(s) 610, and a display device 630 all of which are coupled to a bus 612. Processor(s) 602 include one or more processors or controllers that execute instructions stored in memory device(s) 604 and/or mass storage device(s) 608. Processor(s) 602 may also include various types of computer-readable media, such as cache memory.

Memory device(s) 604 include various computer-readable media, such as volatile memory (e.g., random access memory (RAM) 614) and/or nonvolatile memory (e.g., read-only memory (ROM) 616). Memory device(s) 604 may also include rewritable ROM, such as Flash memory.

Mass storage device(s) 608 include various computer readable media, such as magnetic tapes, magnetic disks, optical disks, solid-state memory (e.g., Flash memory), and so forth. As shown in FIG. 6, a particular mass storage device is a hard disk drive 624. Various drives may also be included in mass storage device(s) 608 to enable reading from and/or writing to the various computer readable media. Mass storage device(s) 608 include removable media 626 and/or non-removable media.

I/O device(s) 610 include various devices that allow data and/or other information to be input to or retrieved from computing device 600. Example I/O device(s) 610 include cursor control devices, keyboards, keypads, microphones, monitors or other display devices, speakers, printers, network interface cards, modems, lenses, CCDs or other image capture devices, and the like.

Display device 630 includes any type of device capable of displaying information to one or more users of computing device 600. Examples of display device 630 include a monitor, display terminal, video projection device, and the like.

Interface(s) 606 include various interfaces that allow computing device 600 to interact with other systems, devices, or computing environments. Example interface(s) 606 include any number of different network interfaces 620, such as interfaces to local area networks (LANs), wide area networks (WANs), wireless networks, and the Internet. Other interface(s) include user interface 618 and peripheral device interface 622. The interface(s) 606 may also include one or more user interface elements 618. The interface(s) 606 may also include one or more peripheral interfaces such as interfaces for printers, pointing devices (mice, track pad, etc.), keyboards, and the like.

Bus 612 allows processor(s) 602, memory device(s) 604, interface(s) 606, mass storage device(s) 608, and I/O device(s) 610 to communicate with one another, as well as other devices or components coupled to bus 612. Bus 612 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 600, and are executed by processor(s) 602. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

What is claimed:

1. A method comprising:
   receiving, by a server system, a first connection request from an agent executing on a first computer system, the agent programmed to generate the first connection request without transmitting any payload data;
   in response to the first connection request, establishing, by the server system, a first connection with the first computer system without receiving any payload data over the first connection such that no connection table entry is created on the server system but a connection table entry is created on the first computer system;
   receiving, by the server system, a second connection request from a second computer system;
   in response to the second connection request, establishing, by the server system, a second connection with the second computer system;
   receiving, by the server system, one or more packets over the second connection, the one or more packets including payload data; and
   in response to receiving the payload data in the one or more packets, determining that the second computer system is engaged in malicious activity whereas the first connection over which no payload data is transmitted is not determined to be a result of malicious activity;
   wherein the method further comprises:
   acquiring, by the server system, a plurality of unassigned internet protocol (IP) addresses without assigning the unassigned IP addresses to an interface;
   performing network address translation to route packets referencing the plurality of unassigned IP addresses to the server system;
   transmitting, by the server system, the plurality of unassigned IP addresses to the first computer system over a secure channel, the first connection request not being received over the secure channel;
   wherein the first connection request is addressed to one of the plurality of unassigned IP addresses.

2. The method of claim 1, wherein the only communication with the first computer system is no more than a TCP (transmission control protocol) handshake; and
   wherein the one or more packets include more than a TCP handshake.

3. The method of claim 1, further comprising:
   assigning, by the server system, a unique host name to each unassigned IP address of the plurality of unassigned IP addresses; and
   responding, by the server system, to hostname requests addressed to the each unassigned IP address of the plurality of unassigned IP addresses with the unique host name assigned to the each unassigned IP address.

4. The method of claim 3, further comprising for each unassigned IP address of the plurality of unassigned IP addresses:
   transmitting, by the server system, simulated traffic referencing the each unassigned IP address and the unique host name assigned to the each unassigned IP address.

5. The method of claim 4, wherein the simulated traffic is at least one of a host announcement and initiation of a registration process.

6. The method of claim 4, wherein the simulated traffic comprises a broadcast message according to at least one of:
   NetBIOS (basic input output system) Name Service (NBNS) protocol using the unique host names;
   Link-Local Multicast Name Resolution (LLMNR) protocol using the unique host names; and
   multicast domain name resolution (mDNS) protocol using the unique host names.

7. The method of claim 1, further comprising:
for each unassigned IP address of the plurality of unassigned IP addresses assigning, by the server system, a grouping of services to the each unassigned IP address, the grouping of services being a subset of all services implemented by the server system;
receiving, by the server system, for a first IP address of the plurality of unassigned IP addresses, a first request for a first service not included in the grouping of services assigned to the first IP address; and
in response to receiving the first request, transmitting, by the server system, a response to the first request indicating that the first service is not available even though the first service is available on the server system.

8. A server system comprising one or more processing devices and one or more memory devices, the one or more memory devices storing executable code effective to cause the one or more processors to:
receive a connection request from a computer system;
in response to the connection request, establish a connection with the computer system;
if one or more packets are received over the connection that include payload data, determine that the computer system is engaged in malicious activity and make an entry in a connection table; and
if the no packets are received over the connection that include payload data, do not determine that the computer system is engaged in malicious activity and make no entry in in the connection table for the connection;
wherein the executable code is further effective to cause the one or more processors to:
acquire a plurality of unassigned internet protocol (IP) addresses without assigning the unassigned IP addresses to an interface;
perform network address translation to route packets referencing the plurality of unassigned IP addresses to the server system;
transmit the plurality of unassigned IP addresses to the computer system over a secure channel, the connection request not being received over the secure channel;
wherein the connection request is to one of the plurality of unassigned IP addresses.

9. The server system of claim 8, wherein the executable code is further effective to cause the one or more processors to determine that the computer system is engaged in malicious activity in response to any communication from the computer system other than a TCP (transmission control protocol) handshake.

10. The server system of claim 8, wherein the executable code is further effective to cause the one or more processors to:
assign a unique host name to each unassigned IP address of the plurality of unassigned IP addresses; and
respond to hostname requests addressed to the each unassigned IP address of the plurality of unassigned IP addresses with the unique host name assigned to the each unassigned IP address.

11. The server system of claim 10, wherein the executable code is further effective to cause the one or more processors to, for each unassigned IP address of the plurality of unassigned IP addresses:
transmit simulated traffic referencing the each unassigned IP address and the unique host name assigned to the each unassigned IP address.

12. The server system of claim 11, wherein the simulated traffic is at least one of a host announcement and initiation of a registration process.

13. The server system of claim 11, wherein the simulated traffic comprises a broadcast message according to at least one of:
NetBIOS (basic input output system) Name Service (NBNS) protocol using the unique host names;
Link-Local Multicast Name Resolution (LLMNR) protocol using the unique host names; and
multicast domain name resolution (mDNS) protocol using the unique host names.

14. The server system of claim 8, wherein the executable code is further effective to cause the one or more processors to:
for each unassigned IP address of the plurality of unassigned IP addresses assign a grouping of services to the each unassigned IP address, the grouping of services being a subset of all services implemented by the server system;
receiving, by the server system, for a first IP address of the plurality of unassigned IP addresses, a first request for a first service;
if the first service is not included in the grouping of services assigned to the first IP address, transmit a response to the first request indicating that the first service is not available even though the first service is available on the server system; and
if the first service is included in the grouping of services assigned to the first IP address, respond to the first request using the first service.

* * * * *